United States Patent [19]

Funahashi

[11] Patent Number: 5,600,393
[45] Date of Patent: Feb. 4, 1997

[54] MECHANISM FOR OPENING AND CLOSING CARTRIDGE COMPARTMENT COVER OF CAMERA

[75] Inventor: Akira Funahashi, Sakai, Japan

[73] Assignee: Minolta Co., Ltd., Osaka, Japan

[21] Appl. No.: 363,025

[22] Filed: Dec. 23, 1994

[30] Foreign Application Priority Data

Dec. 28, 1993 [JP] Japan ................... 5-335211

[51] Int. Cl.$^6$ ........................... G03B 17/26; G03B 17/02
[52] U.S. Cl. ........................... 396/513; 396/538
[58] Field of Search ...................... 354/288, 275

[56] References Cited

U.S. PATENT DOCUMENTS

| | | | |
|---|---|---|---|
| 4,714,335 | 12/1987 | Desormeaux | 354/214 |
| 5,200,777 | 4/1993 | Zander | 354/275 |
| 5,231,438 | 7/1993 | Smart. | |
| 5,305,039 | 4/1994 | Dassero | 354/288 |
| 5,319,407 | 6/1994 | DiRisio | 354/275 |
| 5,357,303 | 10/1994 | Wirt | 354/275 |
| 5,359,378 | 10/1994 | Zander et al. | 354/275 |
| 5,463,435 | 10/1995 | Ezawa | 354/21 |
| 5,473,401 | 12/1995 | Tsunefuji | 354/288 |

FOREIGN PATENT DOCUMENTS

| | | |
|---|---|---|
| 54-128732 | 10/1979 | Japan. |
| 55-46732 | 4/1980 | Japan. |

Primary Examiner—Howard B. Blankenship
Assistant Examiner—Daniel Chapik
Attorney, Agent, or Firm—Burns, Doane, Swecker & Mathis, LLP

[57] ABSTRACT

A mechanism, provided in a camera with a cartridge compartment to which a film cartridge having a light-intercepting door is loaded, which opens the light-intercepting door only if a cover of the cartridge compartment is closed. The mechanism has a film detecting lever which detects if a film is fed out of the film cartridge or not; and a switching lever, for opening and closing the cover in association with an opening and closing movement of the light-intercepting door of the film cartridge, whose operation is controlled by a position of the film detecting lever. That is, if the film detecting lever detects that the film is fed out of the film cartridge, the film detecting lever prevents the switching lever from being unlocked from the compartment cover, while if the film detecting lever detects that the film is not fed out of the film cartridge, the film detecting lever allows the switching lever to be unlocked from the compartment cover.

12 Claims, 10 Drawing Sheets

MECHANISM FOR OPENING AND CLOSING CARTRIDGE COMPARTMENT COVER OF CAMERA

BACKGROUND OF THE INVENTION

1. Field of the Invention

The present invention generally relates to a mechanism for opening and closing a cartridge compartment cover of an apparatus, and particularly relates to the mechanism, of a camera which employs a film cartridge having a light-intercepting door at a film passageway, which closes the light-intercepting door of the film cartridge in association with an opening movement of an operational member used for opening and closing the cartridge compartment cover.

2. Description of the Related Arts

Conventionally, there has been provided a camera, employing a normal film cartridge, which is so constructed that the cartridge compartment cover is prevented from being opened when a film is fed outside the film cartridge set in the cartridge compartment.

For example, the camera disclosed in Japanese Laid-Open Patent Publication No. 54-128732 has a following construction: The camera has a film rewinding spool, having a notch, which can be moved up and down by a user, a rotatable lever whose one end is pivotally supported by the camera frame and whose middle part engages with the notch of the film rewinding spool, a parallel-moving lever which is driven by the other end of the rotatable lever and which has a hook with which a pin fixed to the cartridge compartment cover engages when the cover is closed, and a magnet, whose electric switch is turned on when the film is fed outside the film cartridge and presses down the switch, for attracting one end of a safety lock lever whose other end is rotatably supported by the main frame of the camera. With this mechanism, a projection which is formed on the safety lock lever engages with a cutout made in the parallel-moving board to keep the pin of the compartment cover being locked in the hook of the parallel-moving board for preventing the cartridge compartment cover from being opened, when the film is fed out of the film cartridge with the cover being closed.

As another example, the camera disclosed in Japanese Laid-Open Patent Publication No. 55-46732 has a following construction: The camera has a film winding spool with a small-diametrical axial part which is covered by a film if the film is wound around the spool, a film detecting mechanism whose detecting member is biased by a spring to touch the periphery of the small-diametrical axial part in order to detect whether a film is wound around the film winding spool or not, a locking member, driven in association with the movement of the detecting member of the detecting mechanism, which engages with a notch formed in a film rewinding spool when the detecting member of the detecting mechanism detects no film around the film winding spool, and an operational member to operate the locking member. With this construction, if the film is fed out from the film cartridge set in the cartridge compartment and is wound around the film winding spool, the locking member engages with the notch of the film winding spool. Accordingly, even if a user operates the operational member, the film rewinding spool is prevented from being pulled out to open the compartment cover.

Meanwhile, a film cartridge having a light-intercepting door at a film passageway has been proposed as a new type of a film cartridge. An apparatus, such as a camera, employing such a film cartridge requires to be so constructed that the light-intercepting door is opened and closed when a user puts in and takes out the film cartridge with respect to the cartridge compartment. As a mechanism provided in a camera to realize this function, a mechanism for opening and closing a cartridge compartment cover, which is so constructed that a closing operation of the light-intercepting door is executed in association with the movement of an operational member of the cartridge compartment cover, has been disclosed, for example, in the U.S. Pat. No. 5,231,438.

However, if a user carelessly operates the knob for opening and closing the cartridge compartment cover when the film is outside the film case which is set inside the cartridge compartment of the camera, there exists a possibility that the film may be damaged or scarred by the light-intercepting door because of the film being sandwitched between the light-intercepting door and the film case at the film passageway, and/or that the film may be deformed so that the flatness of the film is spoiled. In case that the camera employing such a film cartridge is a normal winding type of a camera, a part of the film which may get damaged is the very part which is exposed to light upon photographing. Therefore, if the damaged part of the film is actually exposed to light, an image with a flaw would be recorded in the film, thus the quality of the image being degraded.

SUMMARY OF THE INVENTION

One object of the present invention is, therefore, to provide a mechanism for opening and closing a cartridge compartment cover of an apparatus or a camera which prevents a film from being damaged or scarred, or prevents a quality of the image recorded in the film from being spoiled, with the film being outside a film case set in the cartridge compartment, when a user misuses an operational member used for opening and closing the cartridge compartment cover.

Another object of the present invention is to provide the mechanism by which the film is surely prevented from being exposed to light carelessly when the film is outside the film case set in the cartridge compartment.

In accomplishing this and other objects of the present invention, there is provided an apparatus or a camera which employs a film cartridge having a film case with a film passageway and a light-intercepting door that opens and closes the film passageway, comprising: a driving mechanism which drives the light-intercepting door to open and close the film passageway; a detecting mechanism which detects whether the film is fed through the film passageway outside the film case of the film cartridge or not; and a prohibiting mechanism which prohibits the light-intercepting door from being closed by the driving mechanism when the detecting mechanism detects that the film is fed outside the film case of the film cartridge. The driving mechanism has an operational member which is operated by a user's hand from outside.

According to this mechanism, because the prohibiting mechanism prohibits the driving mechanism from driving the light-intercepting door to close when the detecting mechanism detects that the film is fed outside the film case, the film is surely prevented from being damaged or scarred even if a user wrongly operates the driving mechanism with the film being outside the film case.

Preferably, the apparatus or the camera comprises a cartridge compartment in which the film cartridge is housed, and an opening and closing mechanism which opens and closes the cartridge compartment, wherein the driving mechanism drives the light-intercepting door to close the film passageway in association with an operation of the opening and closing mechanism to open the cartridge compartment, wherein the opening and closing mechanism is prohibited from opening the cartridge compartment in association with an operation of the prohibiting mechanism to prohibit the light-intercepting door from being closed by the driving mechanism when the detecting mechanism detects that the film is fed outside the film case of the film cartridge.

According to this mechanism, because it is possible to open the cartridge compartment only if the light-intercepting door is closed with all the film being housed inside the film case, any careless exposure of the film to light is surely prevented when the film is outside the film case set in the cartridge compartment.

Meanwhile, in stead of providing the apparatus or the camera with the above detecting and prohibiting mechanisms, the apparatus or the camera can be provided with a detecting mechanism which detects whether or not the driving mechanism drives the light-intercepting door to close the film passageway while the film is fed through the film passageway outside the film case; and a film feeding mechanism which feeds one frame of the film from the film case to a film winding spool of the camera every time an operation to photograph is over when the detecting mechanism does not detect that the driving mechanism drives the light-intercepting door to close the film passageway with the film being fed outside the film case, and which feeds the film corresponding to more than one frame thereof from the film case to the film winding spool every time an operation to photograph is over when the detecting mechanism detects that the driving mechanism drives the light-intercepting door to close the film passageway with the film being fed outside the film case.

According to this mechanism, even if the film is damaged or scarred by the driving mechanism, the degradation of the quality of the film image recorded therein is prevented because the part of the film which may be damaged or scarred is skipped by feeding the film corresponding to more than one frame from the film case to the film winding spool.

Preferably, the film corresponding to more than one frame is the film corresponding to two frames.

With this design, just one new frame of the film is set ready for photographing even if the film is damaged or scarred by the driving mechanism.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
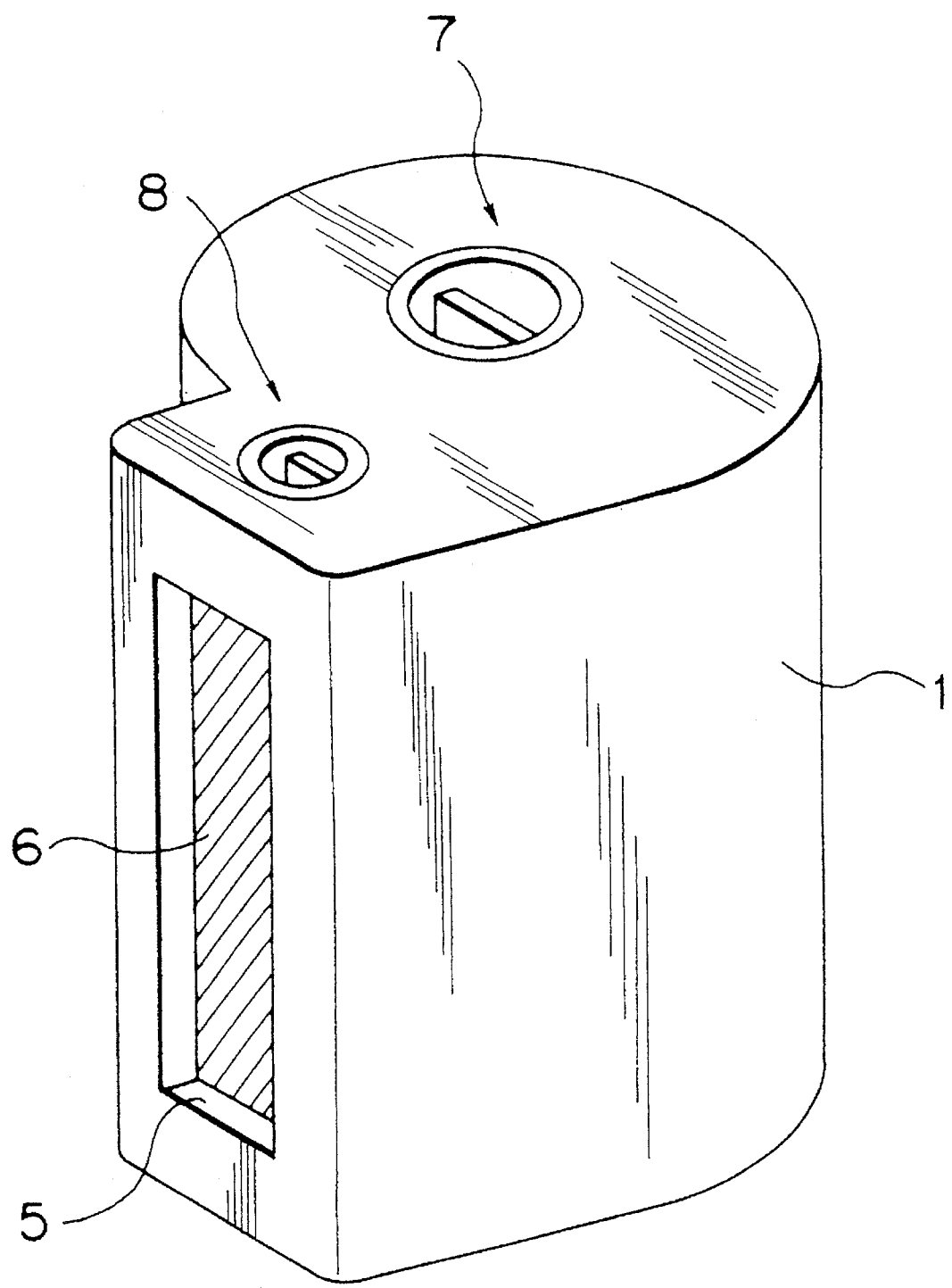
FIG. 1 is a general perspective view of a film cartridge, which has a light-intercepting door at a film passageway, used for a camera in which a mechanism for opening and closing a cartridge compartment cover according to the present invention is provided.

Before the description of the present invention proceeds, it is to be noted that like parts or corresponding parts are designated by like reference numerals throughout the accompanying drawings.

Referring to FIGS. 1–13, a full description of a mechanism for opening and closing a cartridge compartment cover of a camera according to the present invention is made below.

Figure 2:
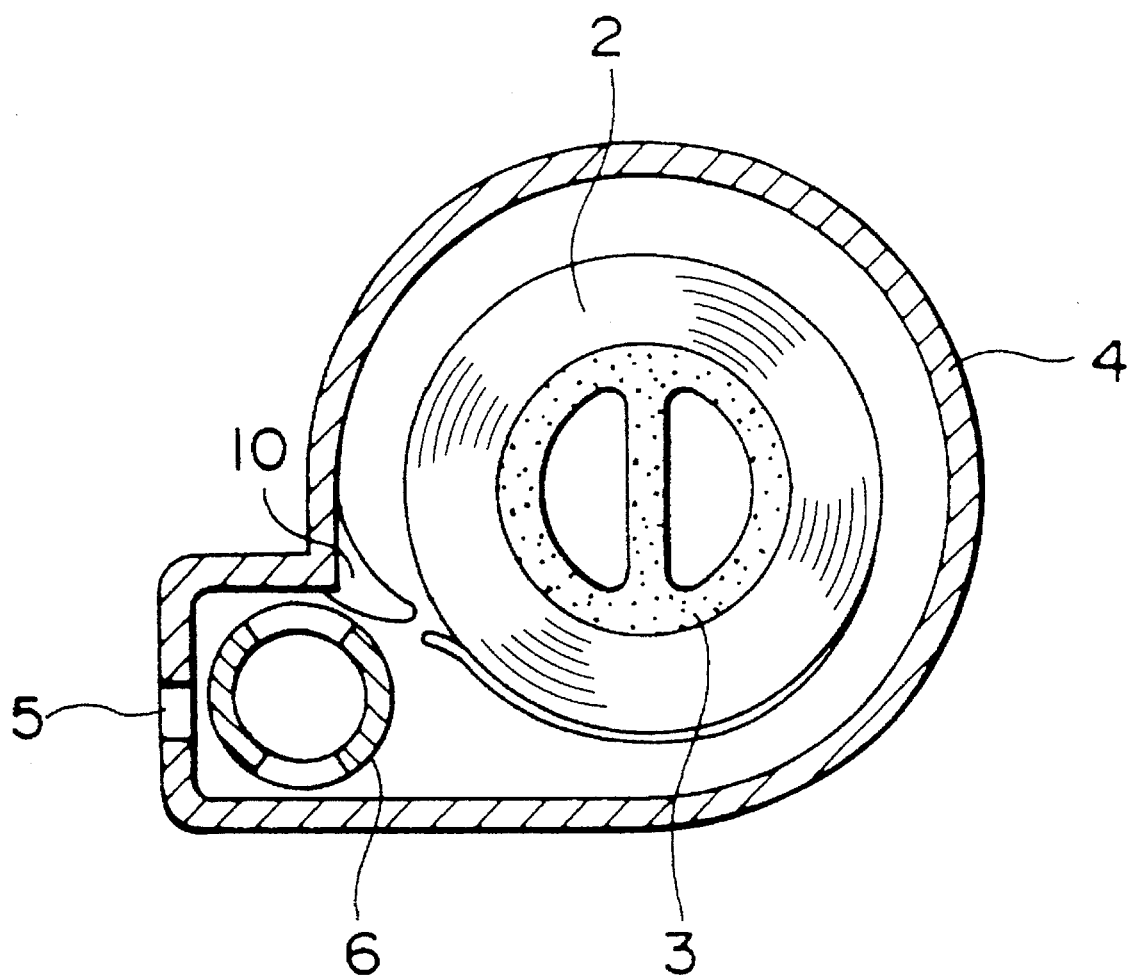
FIG. 2 is a sectional view, of the film cartridge shown in FIG. 1, shown by cutting the film cartridge by a plain perpendicular to an axis thereof generally at a central part of its length.
Figure 3:
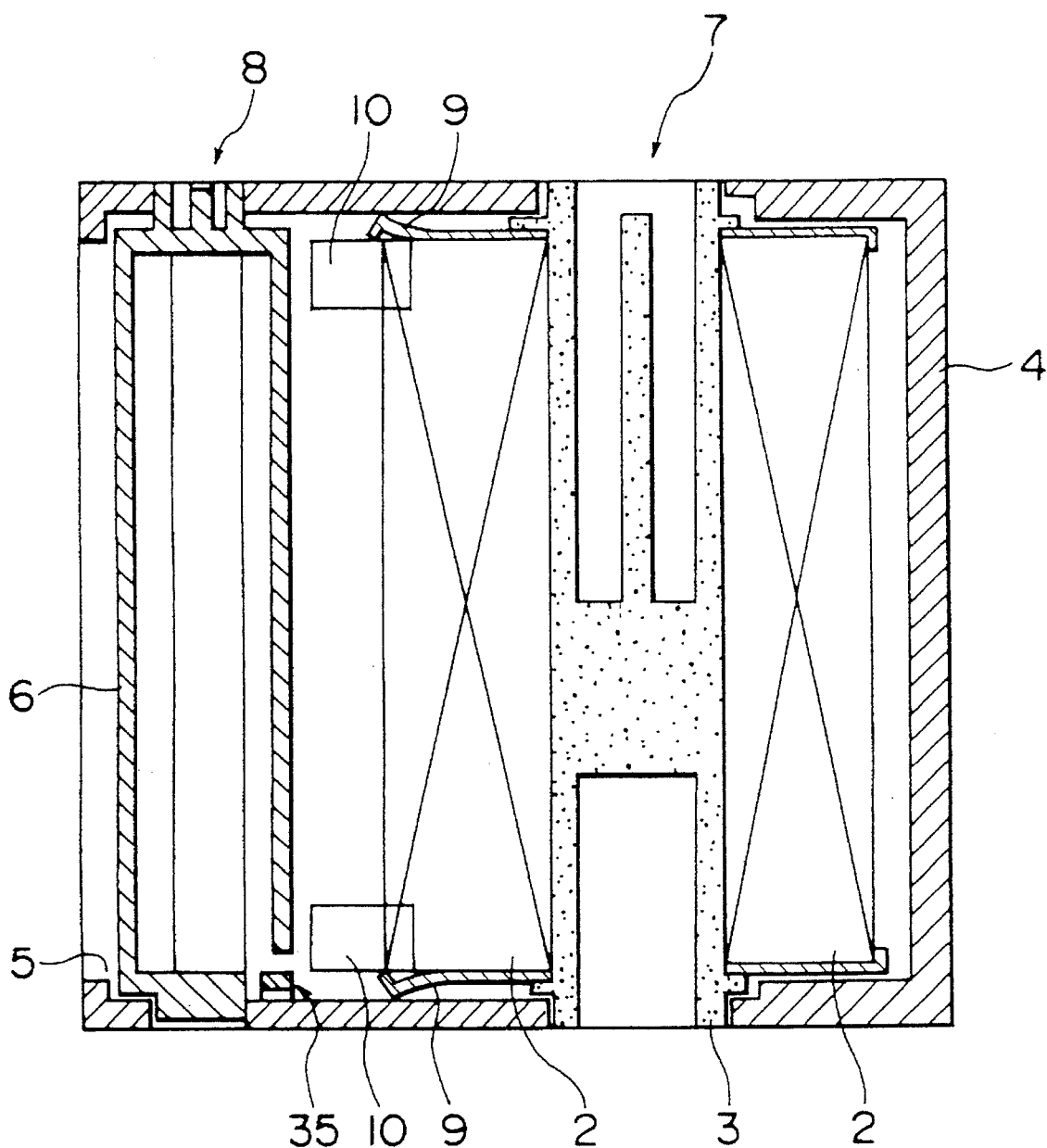
FIG. 3 is a longitudinal, sectional view of the film cartridge shown in FIG. 1.

Firstly, referring to FIGS. 1–3, a description of a film cartridge having a light-intercepting door which is opened and closed by the mechanism for opening and closing the cartridge compartment cover is made.

FIG. 1 is a perspective view of the film cartridge having the light-intercepting door which is opened and closed by the mechanism for opening and closing the cartridge compartment cover of the camera according to the present invention; FIG. 2 is a sectional view, of the film cartridge of FIG. 1, shown by cutting the film cartridge by a plain perpendicular to an axis thereof generally at a central part of its length; and FIG. 3 is a longitudinal, sectional view of the film cartridge of FIG. 1. The film cartridge 1 has a construction that a film 2 is housed inside an outer shell 4 with the film 2 being wound around a spool 3 and that a light-intercepting-door 6 is rotatably supported by the outer shell 4 inside a film passageway 5 formed in the outer shell 4. The film cartridge 1 has a first interface 7 for rotating the spool 3 to feed the film 2 in and out with respect to the outer shell 4, and a second interface 8 for rotating the light-intercepting door 6 to open and close the film passageway 5, each of the interfaces 7 and 8 being exposed outwardly through holes formed in a bottom wall of the outer shell 4.

The film cartridge 1 has a pair of disks 9, made of elastic material, each of whose peripheral edge is formed bent inwards substantially at 90° with respect to a base part of the disk 9. With this construction, some part of the outermost film 2 contacts the inner surface of the peripheral edge of the disk 9 because the film 2 has its own elasticity by which the film 2 is unwound loose outwardly. The film cartridge 1 has a pair of claws 10 projecting near the film passageway 5 from the outer shell 4, by which the peripheral edges of the disks 9 are so flexed outwardly that the film 2 is allowed to be fed out through the film passageway 5. The claws 10 have a function not only to flex the peripheral edges of the disks 9 outwardly, but also to scoop up a leader of the film 2 to guide it to the film passageway 5.

The film cartridge 1 is provided with a click projection 35 which enables the light-intercepting door 6 to be clicked fixedly with respect to the outer shell 4 at a closing position at which the light-intercepting door 6 is closed. The reason why the click projection 35 is provided inside the outer shell 4 is to prevent the light-intercepting door 6 at the closing position from being opened carelessly. In other words, if the light-intercepting door 6 at the closing position is opened carelessly, there is a possibility that the film 2 inside the outer shell 4 may be exposed to light inconveniently.

Hereinafter, a description of a mechanism for opening and closing the cartridge compartment cover of the camera according to a first embodiment of the present invention is made, with reference to FIGS. 4–9.

Figure 4:
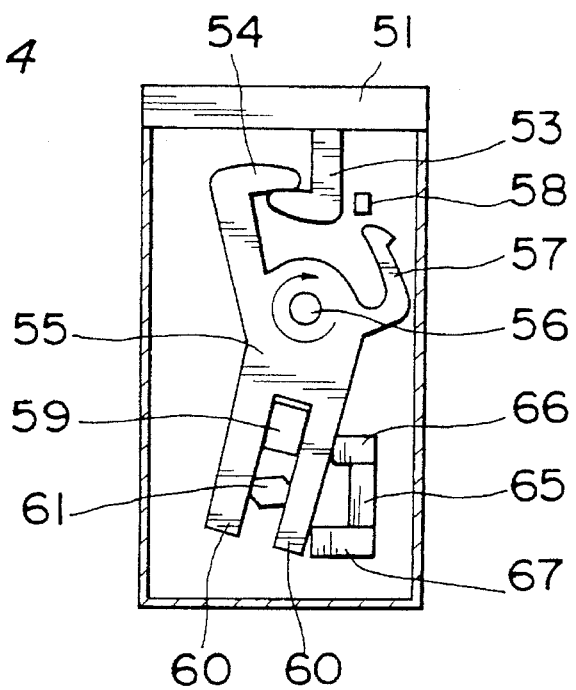
FIG. 4 is a partially sectional view showing the mechanism for opening and closing the cartridge compartment cover, according to a first embodiment of the present invention, from a sideward direction of the camera, which shows a state in which the cartridge compartment cover is closed with the camera being loaded with the film cartridge whose film is fed out from the cartridge.
Figure 5:
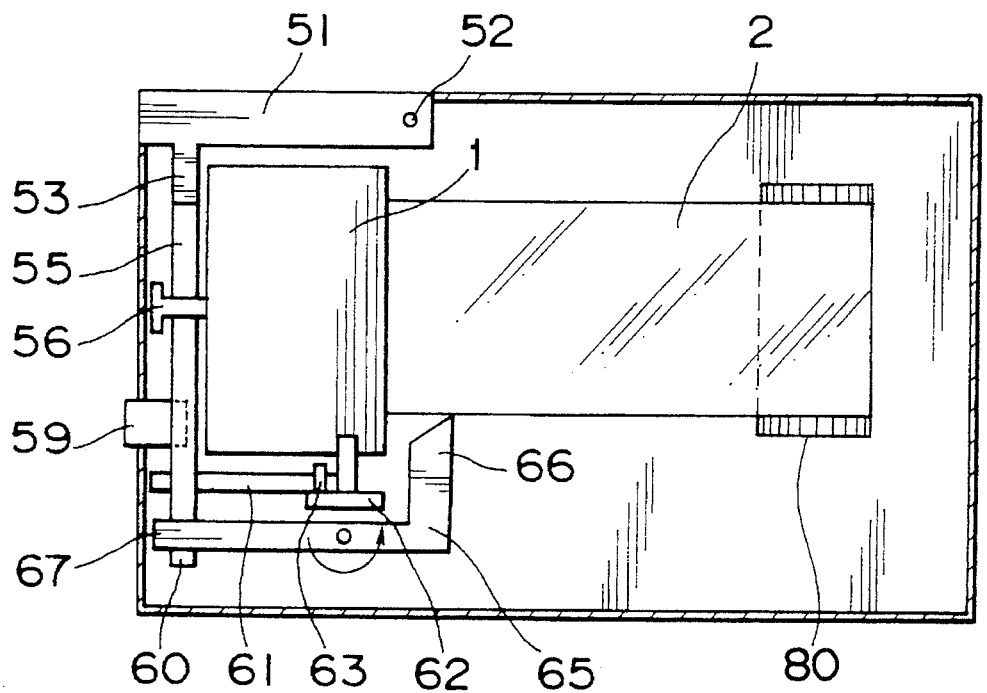
FIG. 5 is a partially sectional view showing the mechanism of the first embodiment from a rearward direction of the camera, which shows a state in which the cartridge compartment cover is closed with the camera being loaded with the film cartridge whose film is fed out from the cartridge.

FIG. 4 is a partially sectional view showing the mechanism for opening and closing the cartridge compartment cover from a sideward direction of a camera, and FIG. 5 is a partially sectional view showing the mechanism from a rearward direction of the camera. A cartridge compartment cover 51 is rotatably supported on a main body of the camera by a pivot 52. On a side wall forming a cartridge compartment of the camera is rotatably supported, by a pivot 56, a switching lever 55 having a claw 54 which engages with and disengages from a hook 53 fixed to the cartridge compartment cover 51. The switching lever 55 is biased by a spring (not shown) in a clockwise direction in FIG. 4. The figure shows that the cover 51 is closed, with the camera being loaded with the film cartridge 1 whose film 2 is fed out from the outer shell 4. The reference numeral 57 in FIG. 4 designates an elastically deformable arm integral with the switching lever 55. The arm 57 engages with a projection 58 fixed to the main body of the camera so that, against a force to bias the switching lever 55 by the spring, the switching lever 55 is kept to an opening position at which the cartridge compartment cover 51 can be opened. The reference numeral 59 is an operational member or a knob by which the switching lever 55 is charged towards the opening position; that is, the switching lever 55 is charged towards the opening position by rotating the knob 59 in the counterclockwise direction relative to the pivot 56 in FIG. 4.

Figure 8:
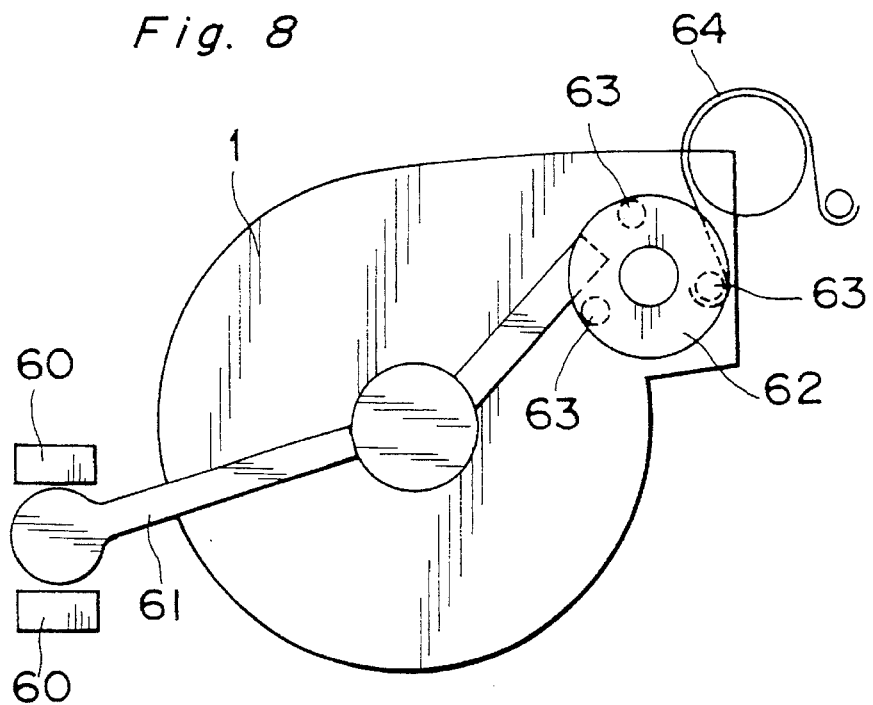
FIG. 8 is a bottom view showing the mechanism corresponding to the state shown in FIGS. 4–7 in which the cartridge compartment cover is closed.
Figure 9:
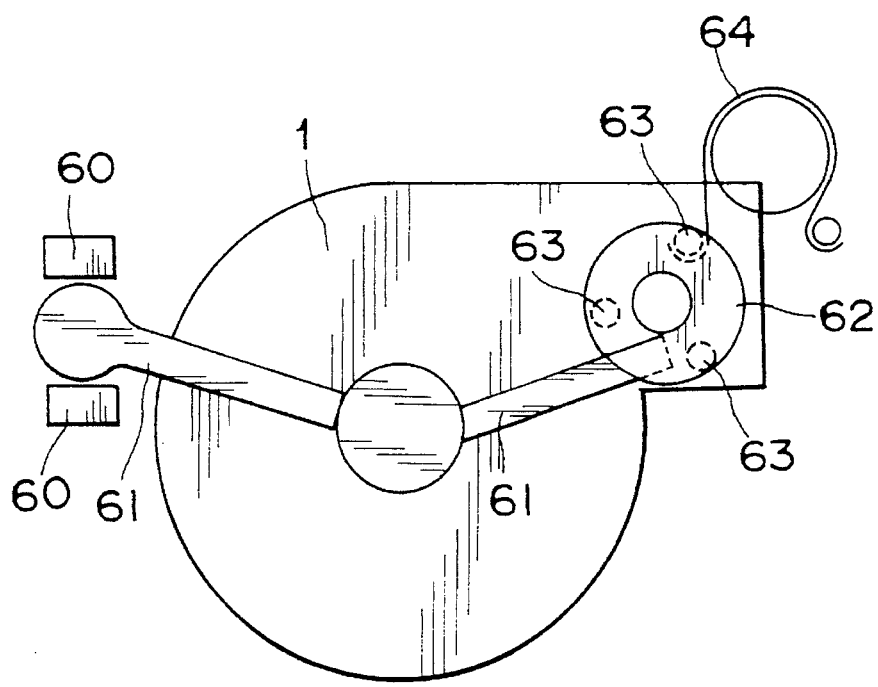
FIG. 9 is a bottom view, similar to FIG. 8, corresponding to a state in which the cartridge compartment cover is opened.

The switching lever 55 has a pair of forked lower edge portions 60 between which the knob 59 and one edge part of an interlocking lever 61 are sandwitched. The other edge part of the interlocking lever 61 cooperates with a second interface driver 62 for driving the second interface 8 of the light-intercepting door 6. That is, when the switching lever 55 is moved to a closing position, as shown in FIGS. 4–7, at which the cartridge compartment cover 51 can be kept to be closed with respect to the cartridge compartment, the forked lower edge portions 60 of the switching lever 55 is moved to the position shown in FIG. 8, which shows the mechanism for opening and closing the cartridge compartment cover from the bottom side of the camera, at which position an interlocking lever 61 sets the light-intercepting door 6 to open. On the other hand, when the switching lever 55 is moved to the opening position, the forked lower edge portions 60 thereof is moved to the position shown in FIG. 9, at which position the interlocking lever 61 sets the light-intercepting door 6 to close. In FIGS. 8 and 9, the reference numeral 63 designates a plurality of pins which are fixed to the second interface driver 62. When one of the pins 63 is pressed by the other edge part of the interlocking lever 61, the second interface driver 62 is rotated. Another pin 63 of the second interface driver 62 engages with one leg of a snap action spring 64, whose other leg fixedly engages with a pin fixed to the main body of the camera. The snap action spring 64 biases the second interface driver 62 either in an opening rotational direction in which the light-intercepting door 6 is opened, or in a closing rotational direction in which the light-intercepting door 6 is closed. Namely, the spring 64 biases the second interface driver 62 in the opening rotational direction when the light-intercepting door 6 is opened, while the spring 64 biases the second interface driver 62 in the closing rotational direction when the door 6 is closed.

Figure 6:
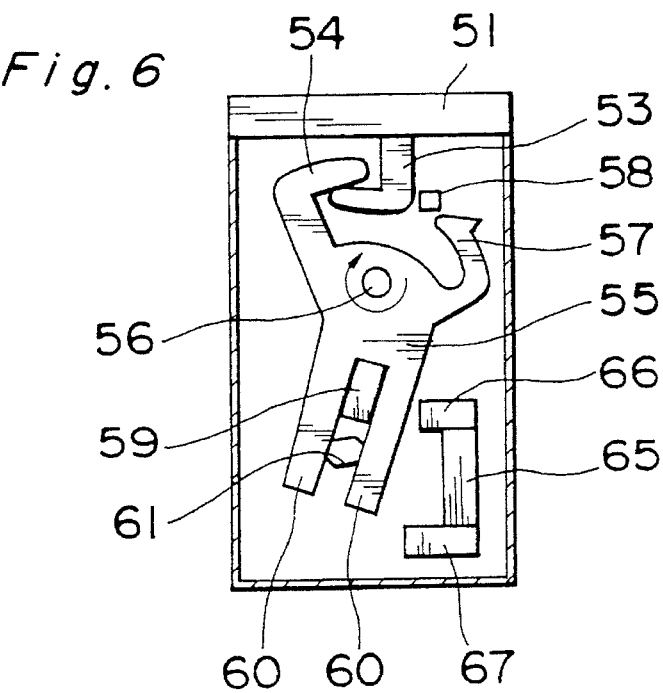
FIG. 6 is a partially sectional view showing the mechanism from the sideward direction of the camera, which shows a state in which the cartridge compartment cover is closed with the camera being loaded with the film cartridge whose film is not outside the film case.
Figure 7:
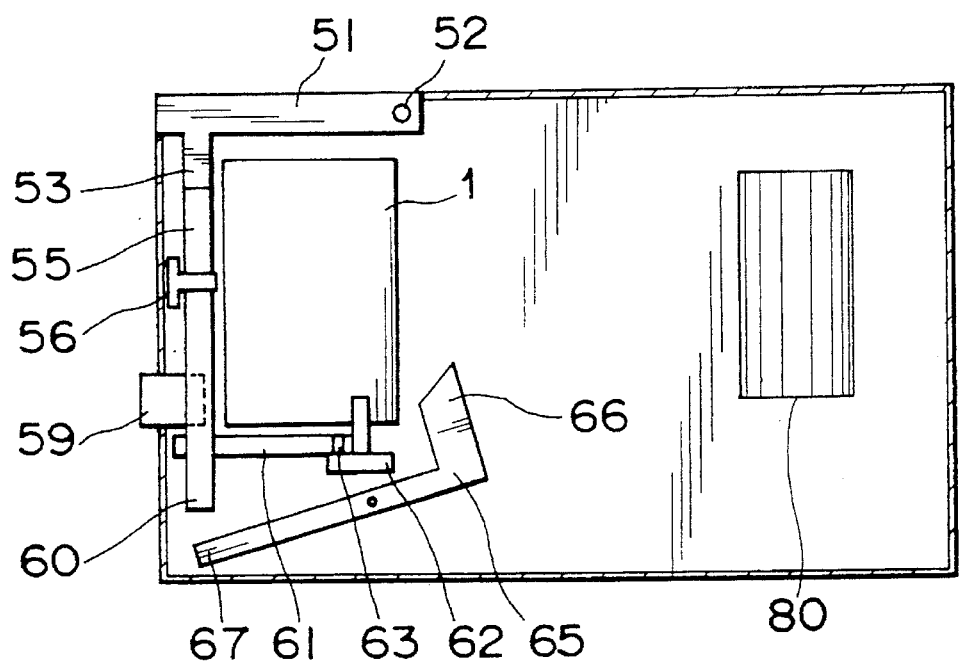
FIG. 7 is a partially sectional view showing the mechanism from the rearward direction of the camera, which shows a state in which the cartridge compartment cover is closed with the camera being loaded with the film cartridge whose film is not outside the film case.

As shown in FIGS. 5 and 7, below the interlocking lever 61 and the second interface driver 62, a film detecting lever 65 is provided. One edge part 66 of the film detecting lever 65 projects within a path in which the film 2 is fed out between the outer shell 4 of the film cartridge 1 and a film winding spool 80 of the camera, as shown in FIG. 7, when the film 2 is not outside the outer shell 4 of the film cartridge 1. Meanwhile, the edge part of the film detecting lever 65 is pushed down by a longitudinal edge of the film 2, as shown in FIG. 5, when the film 2 is outside the outer shell 4 thereof. When the one edge part 66 of the film detecting lever 65 is located at a locking position, as shown in FIG. 5, the other edge part 67 thereof contacts the forked lower edge portion 60 of the switching lever 55, as shown in FIG. 4, so that the switching lever 55 is prevented from unlocking from the hook 53 of the cartridge compartment cover 51 or from being rotated in the counterclockwise direction from a state shown in FIG. 4 even if the knob 59 is operated by a user. Meanwhile, when the other edge part 67 of the film detecting lever 65 is located at an unlocking position, as shown in FIG. 7, the other edge part 67 thereof is located outside a path within which the forked lower edge portions 60 rotates, as shown in FIG. 6, so that the switching lever 55 is allowed to be unlocked from the hook 53 of the cartridge compartment cover 51 or to be rotated in the counterclockwise direction from a state shown in FIG. 6 if the knob 59 is operated by a user.

According to the first embodiment, because the film detecting lever 65 prevents the movement of the switching lever 55, which subsequently prevents the rotation of the light-intercepting door 6 of the film cartridge 1 when the film 2 is outside the outer shell 4 of the film cartridge 1 with the camera being loaded with the cartridge 1, even if the user carelessly operates the knob 59 to open the cartridge compartment cover 51, the cover 51 is surely prevented from being opened and the light-intercepting door 6 of the film cartridge 1 is not closed, thus a part of the film 2 positioned at the film passageway 5 being free from damage or scar.

Meanwhile, although the film is surely prevented from getting damage or scar with the above mechanism, it is possible to prevent the image quality of the film from being degraded with the following mechanism. Hereinafter, a description of the mechanism for opening and closing the cartridge compartment cover of the camera according to a second embodiment of the present invention is made, with reference to FIGS. 10–13.

Figure 10:
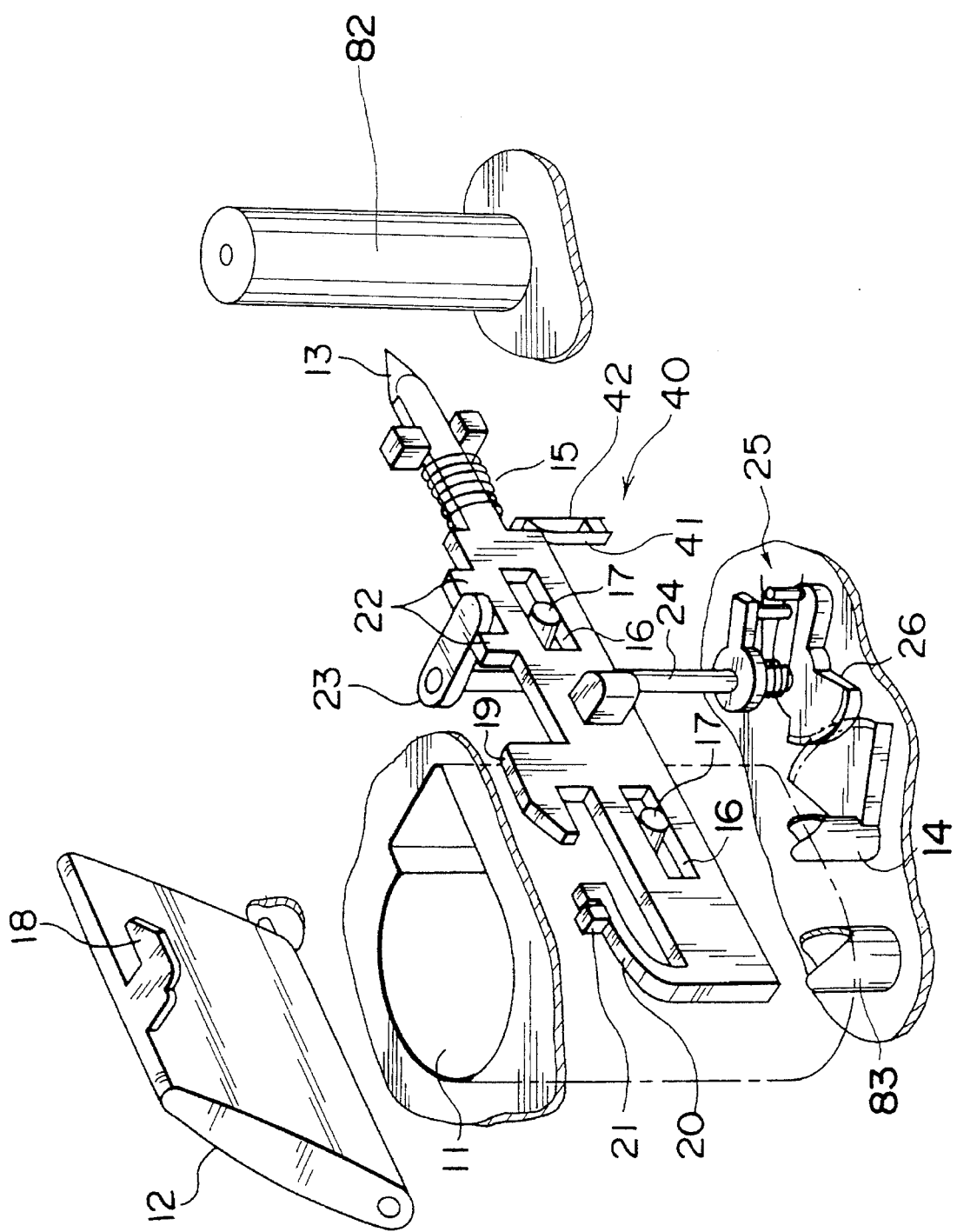
FIG. 10 is an explanatory, perspective view showing a mechanism for opening and closing the cartridge compartment cover, according to a second embodiment of the present invention.

FIG. 10 is a general perspective view of the mechanism for opening and closing the cartridge compartment cover of the camera, which is shown from the rearward direction of the camera. As shown in the figure, the camera has a cartridge compartment 11 behind which the mechanism for opening and closing the cartridge compartment cover is provided.

Behind the cartridge compartment 11, there is provided a cover locking lever 13, which functions as a bar member that prevents a cartridge compartment cover 12 from being opened when the cover 12 is closed. The cover locking lever 13 extends parallel to a direction in which the film 2 is fed between the outer shell 4 of the film cartridge 1, not shown in the figure, and a film winding spool 82 of the camera. The cover locking lever 13 is so supported on the main body of the camera that the lever 13 can be slid in the direction in which the film 2 is fed between the outer shell 4 thereof and the film winding spool 82 of the camera. The sliding movement of the cover locking lever 13 along the direction makes it possible to transmit a driving force from the cover locking lever 13 to a first driving interface 14 which engages with the abovementioned second interface 8 of the film cartridge 1 to rotate the second interface 8. The cover locking lever 13 is biased (to the left in the figure) by a low-coiled spring 15 in such a direction that the cartridge compartment cover 12 positioned in a closing position is locked with respect to the main body of the camera. In the figure, the reference numeral 83 points to a fork or a second driving interface for driving the first interface 7 of the film cartridge 1, 16 points to a pair of guiding notches formed in the cover locking lever 13, and 17 points to a pair of guide pins, which extend inside the guiding notches 46, for guiding the sliding movement of the cover locking lever 13.

The cartridge compartment cover 12 has a hook 18, which engages with a claw 19 of the cover locking lever 13 when the cover 12 is set to the closing position. The cover locking lever 13 has an elastically deformable arm 20 at its one end portion. The arm 20 engages with a projection 21 fixed to the main body of the camera so that the cover locking lever 13 is held at a predetermined position, as shown in FIG. 10, relative to the main body against the biasing force of the spring 15. The predetermined position is such a position that the claw 19 of the cover locking lever 13 does not engage with the hook 18 of the cover 12; namely, it is such a position that the cover 12 is ready to be opened. It is by a handling member not shown in the figure that the cover locking lever 13 is charged to a disengaging position, as shown in FIG. 10, at which the claw 19 of the cover locking lever 13 disengages from the hook 18 of the cover 12. In order to disengage the arm 20 of the cover locking lever 13 from the projection 21, the cartridge compartment cover 12 is closed to push down a tip portion of the arm 20 by the hook 18 of the cover 13. At this time, receiving the biasing force of the spring 15, the tip portion of the arm 20 passes under the projection 21 so that the cover locking lever 13 is moved (towards the left in the figure) to an engaging position at which the claw 19 of the cover locking lever 13 engages with the hook 18 of the cover 12. The hook 18 of the cover 12 is so formed that the tip portion of the arm 20 of the cover locking lever 13 disengages from the projection 21 when the cartridge compartment cover 12 is enough pushed down onto the main body of the camera.

Near the cover locking lever 13 is provided a first switch 40 for detecting whether the cover locking lever 13 is set to the engaging position or the disengaging position. The first switch 40 has a first contact piece 41 and a second contact piece 42 which are constructed so that the switch 40 turns on when the cover locking lever 13 is set to the disengaging position and the first contact piece 41 is pressed against the second contact piece 42 by an edge of the cover locking lever 13, so that the switch 40 turns off when the cover locking lever 13 is set to the engaging position and the first contact piece 41 is moved away from the second contact piece 42 by the elasticity of the first contact piece 41 itself.

The cover locking lever 13 has a pair of projections 22, generally on its central part, which projects upwards with them being parallel to each other. Between the pair of projections 22 is positioned a tip portion of a follower lever 23 which follows the sliding movement of the cover locking lever 13. A proximal end of the follower lever 23 functions as a center around which the following lever 23 rotates, and an upper edge portion of a linking shaft 24 is fixed to the proximal end of the follower lever 23. A lower edge portion of the linking shaft 24 is rotatably connected to a gear 26 via an overcharge spring mechanism 25.

Figure 11:
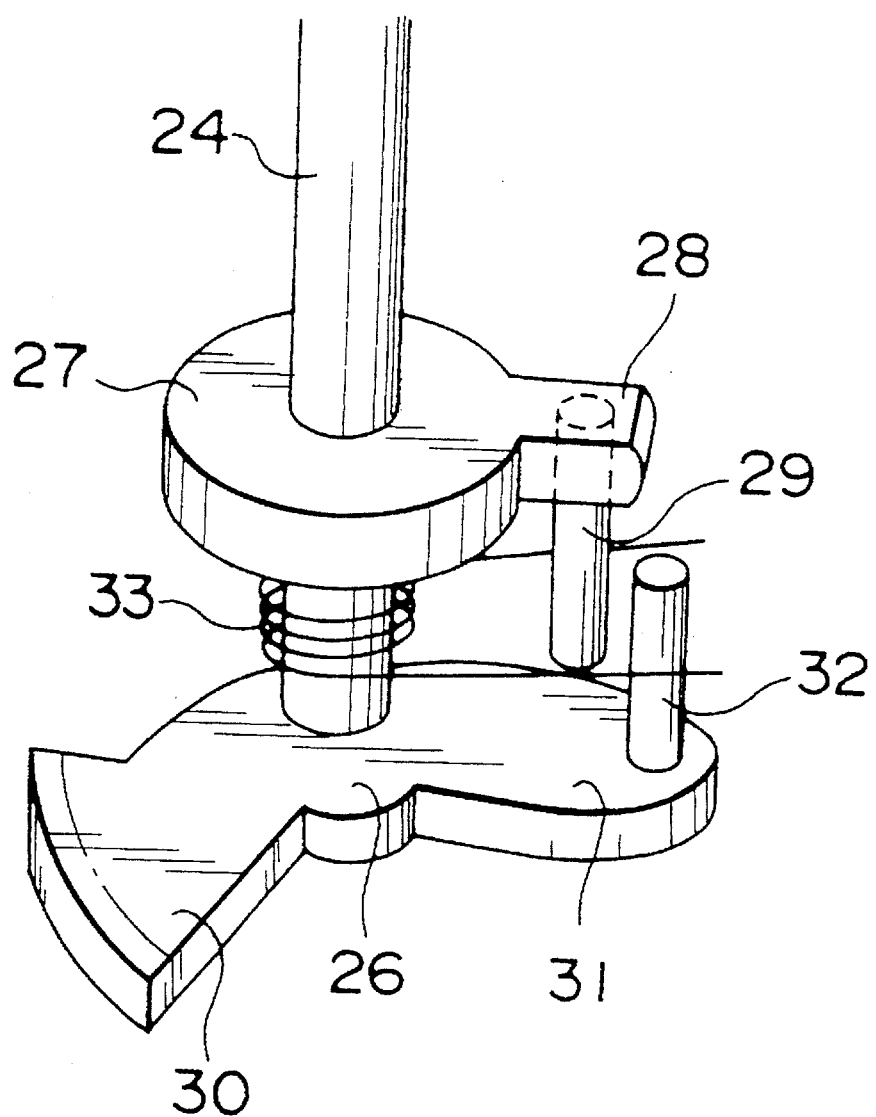
FIG. 11 is a partial enlarged, perspective view of an overcharge spring mechanism shown in FIG. 10.

The overcharge spring mechanism 25 is shown in FIG. 11 in detail. The linking shaft 24 is integral with a flange 27 which has an arm 28 extending outwardly from a peripheral edge thereof in its diametrical direction, and a first pin 29, projecting downwards, that is fixed to the arm 28. A lowermost part of the linking shaft 24 is provided with the gear 26 which is rotatable with respect to the linking shaft 24. As shown in the figure, the gear 26 is not a round gear, and only a partial periphery thereof is formed as a teeth portion 30. The center of the gear 31 corresponds to the axial center of the linking shaft 24. Also, the gear 31 has an extension 31 opposite the teeth portion 30 with respect to the center thereof, and a second pin 32, projecting upwards, that is fixed to the extension 31. Between the flange 27 and the gear 26, a coiled spring 33 is supported by the linking shaft 24 with the shaft 24 extending through the coiled spring 33. Both legs of the coiled spring 33 engage with the first and second pins 29 and 32 so that the pins 29 and 32 are biased, by the legs of the coiled spring 33, in such a direction that the pins 29 and 32 approach each other.

With this mechanism, if the cover locking lever 13 is slid relative to the main body of the camera in order to open and close the cartridge compartment cover 12, the follower lever 23 and the linking shaft 24 are rotated because the pair of projections 22 of the cover locking lever 13 engage with the follower lever 23. The rotation of the linking shaft 24 is transmitted to the gear 26 via the overcharge spring mechanism 25, whose rotation is subsequently transmitted to the first driving interface 14 for rotating the second interface 8 of the film cartridge 1.

Considering that a dimensional precision of products reached upon its manufacturing is not uniform, the rotation stroke, caused by the sliding movement of the cover locking lever 13, of the first driving interface 14 is set to be a bit greater than is actually required. With this setting of the rotation stroke, there is a certain range of overstroke of its rotation between the first driving interface 14 and the second interface 8 of the film cartridge 1 when the second interface 8 thereof is rotated to open and close the light-intercepting door 6; however, the range of overstroke of its rotation is absorbed by the elastic deformation of the spring 33.

Figure 12:
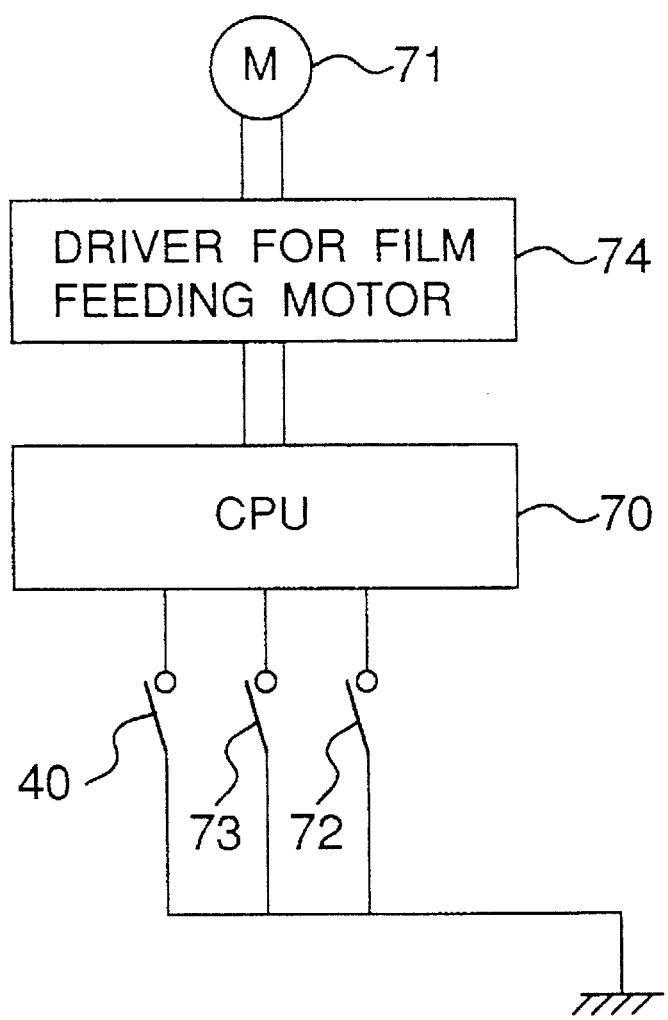
FIG. 12 is a circuit diagram showing a control system, including a microcomputer, for controlling the film feeding motor which is used together with the mechanism shown in FIG. 10.
Figure 13:
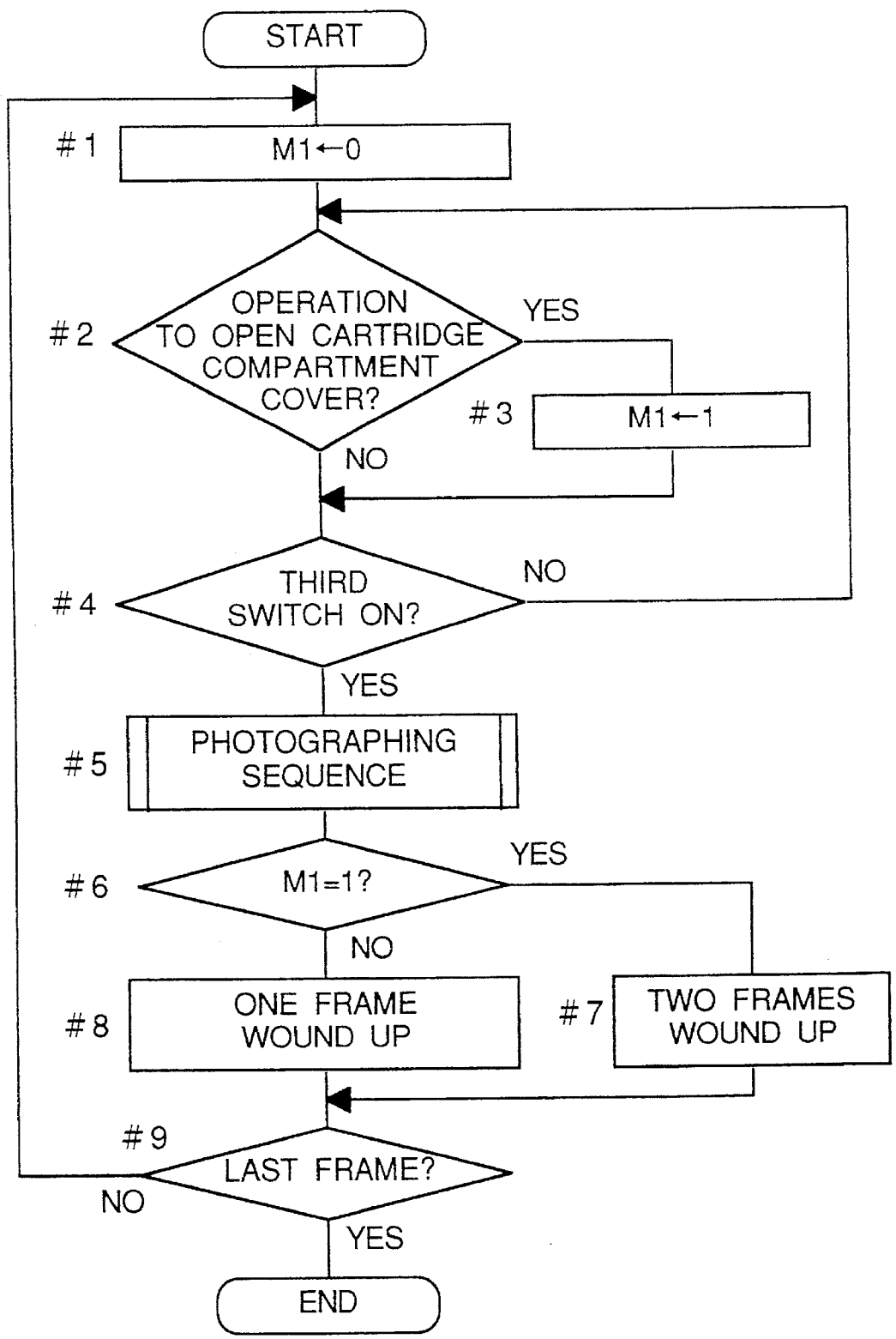
FIG. 13 is a flow chart showing an operation of feeding the film from the outer shell of the film cartridge to the spool of the camera having the mechanism shown in FIG. 10.

Here, it is explained about the operation of the mechanism for opening and closing the cartridge compartment cover of the camera, with reference to FIGS. 12 and 13.

FIG. 12 is a circuit diagram showing a control system of the camera in which a film feeding motor 71 and a microcomputer 70 are provided. In the figure, the reference numeral 72 designates a second switch which, for example, is turned on every time one frame of the film is fed from the outer shell 4 of the film cartridge 1 towards the film winding spool 82 of the camera, and 73 designates a third switch which, for example, is turned on when a release operation is executed. These switches 72 and 73, and the abovementioned first switch 40 send on/off signals to the microcomputer 70, respectively. Between the microcomputer 70 and the film feeding motor 71 is provided a motor driver 74.

Meanwhile, FIG. 13 is a flow chart showing a sequence in accordance with which the film winding operation is carried out. That is, after a memory M1 of the microcomputer 70 is reset to 0 at step #1, it is decided at step #2 if the first switch 40 is turned on or not. Because the first switch 40 being turned on means that the cover locking lever 13 is moved to the disengaging position to open the cartridge compartment cover 12, there is a possibility that the film 2 may be damaged or scarred by being sandwitched between the light-intercepting door 6 and a part of the outer shell 4 at the film passageway 5 of the film cartridge 1; therefore, after resetting the memory M1 to 1 at step #3, it proceeds to step #4.

If the first switch 40, however, remains to be off at step #2, there is no possibility that the cover locking lever 13 may be set to the disengaging position and that the light-intercepting door 6 may be closed; accordingly, it proceeds from step #2 to step #4 directly, skipping step #3.

If it is decided at step #4 that the third switch 73 is turned on, it proceeds to step #5 at which an operation of picture-taking is executed. If the third switch 73 remains off at step #4, it returns to step #2 and the sequence from step #2 to step #4 is repeated until the third switch 73 is turned on at the step #4.

Next, after step #5 ends, it is decided at step #6 if the memory M1 equals 1 or not, and if M1=1, then, it proceeds to step #7 at which two frames of the film 2 is fed out from the outer shell 4 of the film cartridge 1 to the spool 82 of the camera, because M1=1 means that the light-intercepting door 6 of the film cartridge 1 was once closed with the film 2 being outside the outer shell 4 thereof. If it is decided at step #6 that M1=0, it proceeds to step #8 at which only one frame of the film 2 is fed out from the outer shell 4 of the film cartridge 1 to the spool 82 of the camera.

Then, at step #9, it is decided whether all the frames of the film 2 are exposed to light or not. If it is decided at this step #9 that all the frames are exposed to light, the flow of the sequence is over, and if it is decided that all the frames are not exposed to light, it returns to step #1 to repeat the same sequence mentioned above.

As apparent from the above description, the mechanism for opening and closing the cartridge compartment cover of the camera of the second embodiment is so constructed that every time one frame of the film 2 is exposed to light, it is detected whether the first switch 40 is turned on or not. Therefore, if an operation to open the cartridge compartment cover is carried out in spite that the film is not used up to the last frame, the operation of photographing is carried out, skipping the frame of the film 2 that is possibly damaged or scarred by the light-intercepting door of the film cartridge 1, thus preventing a damaged image from being recorded in the frame of the film 2.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus which employs a film cartridge having a film case with a film passageway and a light-intercepting door that opens and closes the film passageway comprising:

a driving mechanism which drives the light-intercepting door to open and close the film passageway;

a detector which detects whether the film is fed through the film passageway outside the film case of the film cartridge; and a prohibiting structure which prohibits the light-intercepting door from being closed by the driving mechanism so as not to catch the film when the detector detects that the film is fed outside the film case of the film cartridge.

2. The apparatus as claimed in claim 1, which further comprises a cartridge compartment in which the film cartridge is housed, and an opening and closing mechanism which opens and closes the cartridge compartment, wherein the driving mechanism drives the light-intercepting door to close the film passageway in association with an operation of the opening and closing mechanism to open the cartridge compartment, wherein the opening and closing mechanism is prohibited from opening the cartridge compartment in association with an operation of the prohibiting structure to prohibit the light-intercepting door from being closed by the driving mechanism when the detector detects that the film is fed outside the film case of the film cartridge.

3. The apparatus as claimed in claim 1, wherein the driving mechanism has an operational member which is operated by a user's hand from outside.

4. An apparatus as claimed in claim 1, wherein said detector includes a contacting part which is arranged in a position where the contacting part comes into contact with the film when the film is fed out from the film cartridge.

5. An apparatus as claimed in claim 4, wherein said detector is moved when the contacting part contacts the film.

6. An apparatus as claimed in claim 1, wherein the driving mechanism is prohibited from moving by the prohibiting structure when the detector detects that the film is fed outside the film case.

7. An apparatus which employs a film cartridge having a film case with a film passageway and a light-intercepting door that opens and closes the film passageway comprising:

a driving mechanism which drives the light-intercepting door to open and close the film passageway; and a prohibiting structure which prohibits the light-intercepting door from being closed so as not to catch the film when a detector judges that the film is fed through the film passageway outside the film case of the film cartridge.

8. An apparatus as claimed in claim 7, further comprising:

a cartridge compartment in which the film cartridge is housed; and an opening and closing mechanism, which opens and closes the cartridge compartment, wherein the driving mechanism drives the light-intercepting door to close the film passageway in association with an operation of the opening and closing mechanism to open the cartridge compartment, and wherein the opening and closing mechanism is prohibited from opening the cartridge compartment in association with an operation of the prohibiting structure to prohibit the light-intercepting door from being closed by the driving mechanism when the film is fed through the film passageway outside the film case of the film cartridge.

9. An apparatus as claimed in claim 7, wherein the driving mechanism has an operational member which is manually operated from outside.

10. An apparatus as claimed in claim 7, wherein the driving mechanism is prohibited from moving by the prohibiting structure when the film is fed outside the film case.

11. An apparatus which employs a film cartridge having a film case with a film passageway and a light-intercepting door that opens and closes the film passageway comprising:

an operational member which is manually operated from outside the apparatus so as to move the light-intercepting door in order to close the film passageway; and a prohibiting structure which prohibits the operational member from being operated so as not to catch the film when a detector judges that the film is fed through the film passageway outside the film case of the film cartridge.

12. An apparatus as claimed in claim 11, further comprising:

a cartridge compartment in which the film cartridge is housed; and an opening and closing mechanism, which opens and closes the cartridge compartment, wherein the light-intercepting door is moved to close the film passageway in association with an operation of the opening and closing mechanism to open the cartridge compartment, and wherein the opening and closing mechanism is prohibited from opening the cartridge compartment in association with an operation of the prohibiting structure to prohibit the operational member from being moved when the film is fed through the film passageway outside the film case of the film cartridge.

* * * * *